Patented Mar. 25, 1930

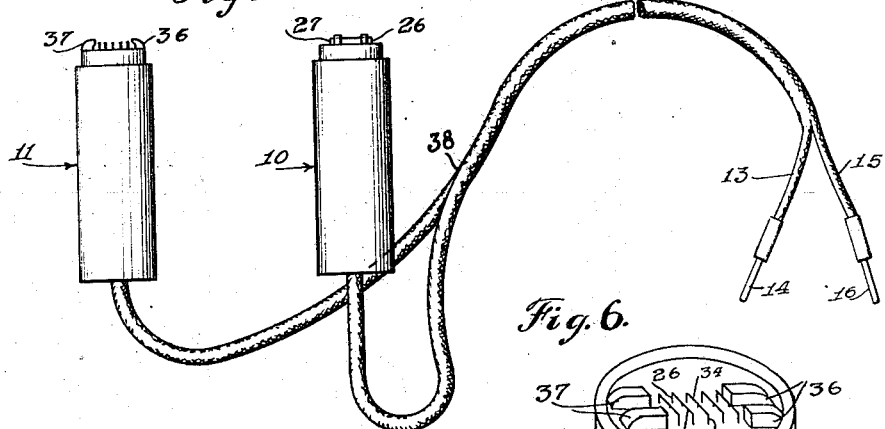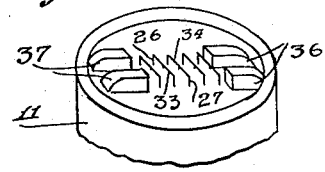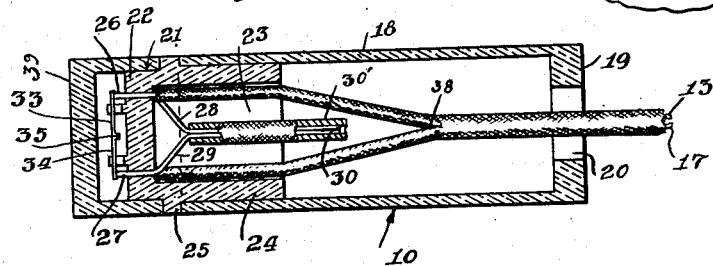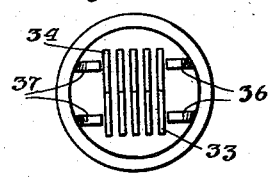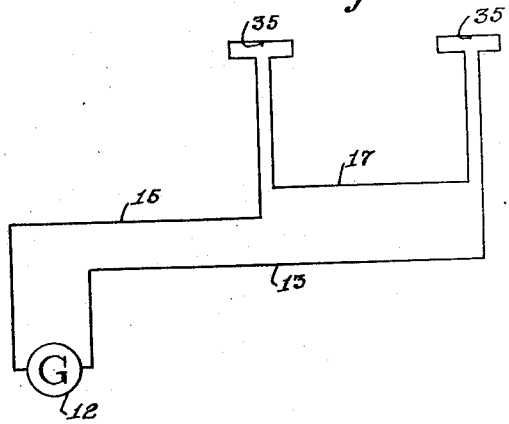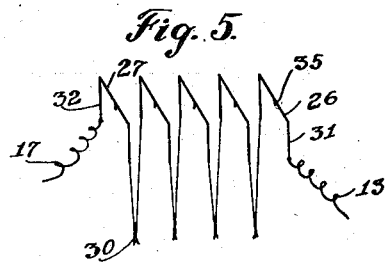

1,752,117

UNITED STATES PATENT OFFICE

WILLIAM SMITH, OF YONKERS, NEW YORK

TEMPERATURE DETECTOR

Application filed September 28, 1928. Serial No. 309,096.

This invention relates to new and useful instruments for detecting the temperature of surfaces generally and more particularly the surface temperatures of the human body, such as by the method or process covered by applicant's Patent No. 1,622,887 dated March 29, 1927.

Applicant is aware that at the present time instruments are used for detecting the temperature of some particular part of the anatomy, such as the spine, but such instruments are limited for use on that particular part of the body and are not of general application. Some of these instruments now in use are formed with a rigid handle which supports rigid arms. Such a rigid construction greatly limits their usefulness. Others provide rigid arms with means for adjusting the same, which means complicates the structure making it expensive. Still others are formed with bridge members over which the wires forming the thermocouple are stretched and because of this truss formation these wires are liable to become lengthened by long use and to slide against each other forming a short circuit.

It is a primary object of the present invention to provide a device for detecting temperatures of surfaces that is simple in construction, positive in action, inexpensive to manufacture and durable in use.

Another object is to prevent the wires forming the thermocouple from becoming displaced and coming into engagement with each other thereby short circuiting the device.

Another object is to protect the thermocouple unit from injury.

Still another object is to provide means for forming a dead air space around the part of the surface under observation thus insulating said part.

Other objects and advantages of the invention will be apparent from the description thereof to follow taken in connection with the accompanying drawing in which—

Figure 1 is a side view of a pair of detectors, one turned 180 degrees relative to the other, and having flexible conductors attached.

Figure 2 is a sectional view through one of the detectors.

Figure 3 is a diagrammatic view of the connection between the detectors and the galvanometer.

Figure 4 is an enlarged top plan view of one of the detectors.

Figure 5 is a diagrammatic view of the wiring of one of the detectors.

Figure 6 is a perspective view of the upper end of one of the detectors.

Referring to the figures of the drawing in detail, in Figure 1 is illustrated a pair of detector units 10 and 11. The detector 10 is connected to a galvanometer or other suitable indicating means, indicated diagrammatically at 12, in Figure 3, by means of a flexible conductor 13 provided with a plug 14 at its end; and the detector 11 is connected to said galvanometer by means of a conductor 15 having a plug 16 at its end. The detectors 10 and 11 are operatively connected together by means of a conductor 17 which will be more fully described hereinafter.

As each of the detectors is similarly constructed, a description of one will suffice for both. In each of said detectors is mounted a thermocouple or a plurality of thermocouples connected in series, each of which thermocouples comprises a junction of two dissimilar metals, such as a junction of copper and constantan, or other suitable metals, which is operatively connected to the galvanometer 12, and on which galvanometer variations in temperature at said junction will be registered.

With particular reference to Figure 2, the detector 10 consists of an elongated handle 18 formed of hard rubber, fiber or other suitable material. This handle 18 is opened at its upper end and is formed with a closure wall 19 at its lower end, said wall 19 being provided with a central opening 20 through which the conductors 13 and 17 are adapted to extend. Mounted in the upper end of the handle is a bearing block 21, said block including a solid upper portion 22, a circumferential flange portion 25 and a depending skirt portion 24, said skirt portion 24 formed with a chamber 23. The skirt portion 24 is adapted to extend interiorly of the handle and the flange 25 is adapted to seat on the upper edge of said handle. Extending upwardly through openings in the solid portion 22 at one side of the center thereof is a plurality of wires 26 formed of copper or other suitable material, five of such copper wires 26 being illustrated in Figure 6; and extending upwardly on the opposite side of said center is a plurality of wires 27 formed of constantan, or of any other material which is dissimilar from copper or from the material used in the wires 26. It will be noted that the wires 26 are disposed in alignment with each other, and that the wires 27 are similarly disposed; and also that the wires 26 are directly opposite the wires 27. These wires 26 and 27 extend only a short distance above the upper surface of the portion 22 of the bearing block. Each of the wires 26 is bent inwardly as indicated at 28 in Figure 2 and the wire 27 directly opposite is also bent inwardly toward the wire 26 as indicated at 29, the remaining portion of each of said wires 26 and 27 extending downwardly from said bend in engagement with each other and joined together at their lower ends by solder as indicated at 30, or in any other suitable manner. The joined portions of said wires are covered with an insulated cover 30' for protective purposes, and extend into the chamber 23. The outer wire 31 (see Figure 5) of the series of wires 26 is connected to the conductor 13, and the outer wire 32 of the series of wires 27, which is at the opposite end of said series, is connected to the conductor 17. Fixed to each of the wires 26 by welding or otherwise and extending toward the center of the bearing block is a flat wire 33 formed of the same material as the wire 26; and fixed to the upper end of each of the wires 27 in a similar manner and extending toward the center of the block is a flat wire 34 formed of the same material as the wire 27. The edges of the oppositely disposed wires 33 and 34 which extend toward the center are joined together by soldering or otherwise to form a juncture 35, making a perfect electric connection. Securely mounting these wires 33 and 34 onto the upper edges of the wires 26 and 27, respectively, makes for a compact and rigid structure and prevents any chance of the wires working sidewise and coming in contact with each other to cause a short circuit.

The conductor 15 in the other detector 11 is similarly connected to the outer wire of the series of wires 26 and the other end of the conductor 17 is connected to the outer wire of the series of wires 27 of said indicator, the said conductor 17 joining the conductors 13 and 15 at the point indicated at 38 in Figure 1, permitting a limited movement of the detectors with respect to each other. As will be understood by those skilled in the art, the conductor 13 leads to the positive post of the galvanometer and the conductor 15 leads to the negative post thereof, and by applying the juncture 35 to the surface being examined any variations in temperature in said surface will pass through said juncture and through said conductors and register on the galvanometer, and by providing a plurality of thermocouples connected in series a more positive and efficient reading is obtained.

An important feature of the present invention is means for protecting the exposed junctions 35 from injury. Formed integrally with the block 21 and extending upwardly from the upper surface of the solid portion 22 thereof and disposed at one end of the series of wires forming the thermocouples is a pair of lugs or posts 36, and disposed at the opposite end is a similar pair of posts 37, each of said posts extending a slight distance above the upper ends of said wires. These posts in addition to protecting the wires and junctures from injury permit the junctures to come into contact with the surface being examined and by indenting the skin, when the surface of the body is being examined, form a sort of pocket or dead air space about the part of the skin under observation thus insulating said point from the outside temperature.

In order to protect the thermocouples from dirt or from accidental injury when not in use, a detachable cap 39 formed of hard rubber or other suitable material is provided, the lower edge of said cap being adapted to engage the upper edge of the flange 25 thus completely closing the upper end of the detector.

In using the improved detectors, the conductors 13 and 15 having first been connected to the galvanometer 12, one or the detectors is placed for instance on the body of the patient where the temperature is normal. The heat radiated from said normal part moves the pointer on the galvanometer to one side of the zero mark. The other detector because of its flexible connection is then placed on another part or parts of the body until a part is found that is of the same temperature as the first mentioned normal part, which is ascertained by reason of the pointer returning to zero when said part is found. This establishes that both of said parts are of the same temperature, and the temperature indicated for either of said parts is used as a standard by which to judge the temperature of any other part or parts of the body. This is accomplished by leaving one of the detectors on the part of the body where it was placed and removing the other from the body which will result in the pointer on the galvanometer being returned to one side of the zero mark to the mark which will be the standard. The other detector which has been removed from the body is then moved over the body and when the said detector comes into contact with a part of the body that is running a temperature or has a temperature which varies from that of the part of the body on which the fixed detector is placed, the temperature given off by said former part is transmitted to the juncture 35 of the thermocouple and is transmitted through said thermocouple and its connections to the galvanometer moving the pointer over to the other side of the zero mark away from the standard mark.

Variations in minor details might be resorted to without departing from the principle of the invention and I desire to be limited only by the appended claims.

I claim:

1. A temperature detector comprising a handle, a thermocouple mounted in said handle and having a plurality of exposed junctions and a plurality of posts spaced around said junctions, the upper ends of said posts extending above the plane of said junctions.

2. A temperature detector comprising a handle, a bearing block mounted in said handle, a thermocouple carried by said block, said thermocouple comprising wires extending upwardly from said bearing block formed of diverse metals and transverse wires fixed to the upper ends of said upwardly extending wires, said transverse wires formed of the same metal as the wire to which affixed and a plurality of posts spaced around said wires, the upper ends of said posts extending above the plane of said transverse wires.

3. A temperature detector comprising a handle, a bearing block mounted in the upper end of said handle, said block including an upper solid portion, an intermediate circumferential flange portion and a lower skirt portion, said skirt portion adapted to snugly engage the inner wall of said handle and said flange portion adapted to rest against the upper edge of said handle, a thermocouple carried by said block, said thermocouple comprising wires extending upwardly through said upper solid portion, the upper ends of said wires extending slightly above the upper surface of said solid portion, said wires formed of diverse metals and transverse wires fixed to the upper ends of said upwardly extending wires, each of said transverse wires formed of the same metal as the upwardly extending wire to which affixed and a plurality of posts spaced around said wires, the upper ends of said posts extending above the plane of said transverse wires.

In testimony whereof, I hereunto affix my signature.

WILLIAM SMITH.